C. W. SALADEE.
Vehicle Torsional-Spring.

No. 160,549.    Patented March 9, 1875.

WITNESSES:

INVENTOR:

UNITED STATES PATENT OFFICE.

CYRUS W. SALADEE, OF PITTSBURG, PENNSYLVANIA.

IMPROVEMENT IN VEHICLE TORSIONAL SPRINGS.

Specification forming part of Letters Patent No. 160,549, dated March 9, 1875; application filed October 15, 1874.

*To all whom it may concern:*

Be it known that I, CYRUS W. SALADEE, of Pittsburg, in the State of Pennsylvania, have invented a certain Improvement in Torsional Springs, of which the following is a specification embodying my invention.

The nature of my invention consists in the arrangement of torsional springs in pairs, one rod of each pair directly over the other, in such manner as to admit of any desired number of pairs being applied, and all operating in unison with each other.

Figure 1:
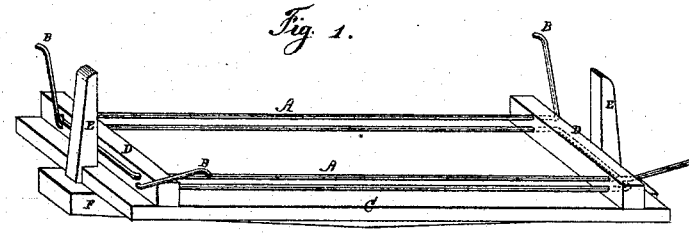
Figure 2:
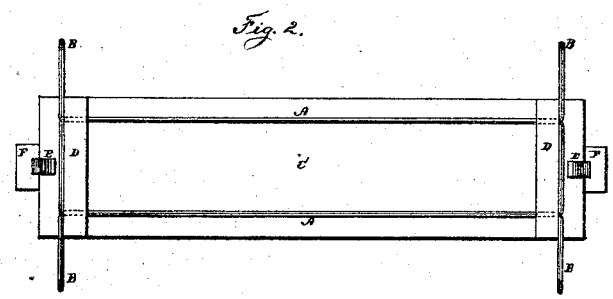

In the drawings, Figure 1 is a perspective view of a wagon-bolster, having in position a double pair of the springs, arranged as above described. Fig. 2 is a top or plan view of the same, and Fig. 3 is an end elevation of the bolster with springs in position.

C is a narrow platform, on each end of which are secured suitable bearings D. Through these bearings are passed two or more pairs of springs, A, whose outer ends terminate in the arms B, on which rest the body of the vehicle.

Figure 3:
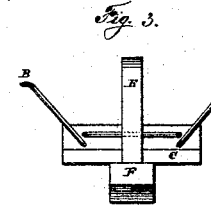

In Figs. 1 and 3 is clearly shown the manner of placing the springs A, (one pair above the other,) and from which it will also be understood that any required number of pairs of springs may, upon this principle, be combined together.

This arrangement of torsional springs I do not limit to any particular or special use, as it will be found desirable not only on wagons and pleasure vehicles, but also in all classes of railway-cars, as also for seat-springs to wagons, &c.

The springs are made from round, square, or compound plates of steel, under either or all of my former patents in this line of invention.

I may here state that the bearings D must be made to conform with the vehicle to which these springs are applied, so that the platform C is not in all cases essential, as the bearings D may be so formed as to apply directly to the bolster or other object without reference to the platform C, (shown in the drawings,) and answer equally well.

I claim as my invention—

Torsional springs, combined in pairs, one rod of each pair above the other, substantially as and for the purpose set forth.

CYRUS W. SALADEE.

Witnesses:
CHAS. P. WEBSTER,
GEORGE T. MASON.